US012589046B2

(12) United States Patent
Anderson et al.

(10) Patent No.: US 12,589,046 B2
(45) Date of Patent: Mar. 31, 2026

(54) SURGERY POSITIONER SYSTEM

(71) Applicant: NuVasive, Inc., San Deigo, CA (US)

(72) Inventors: Bradley S. Anderson, San Diego, CA (US); Stephanie Hagan, San Diego, CA (US); David Yam, Hillsboro, OR (US)

(73) Assignee: Nuvasive Inc., San Diego, CA (US)

( * ) Notice: Subject to any disclaimer, the term of this patent is extended or adjusted under 35 U.S.C. 154(b) by 84 days.

(21) Appl. No.: 18/686,015

(22) PCT Filed: Aug. 15, 2022

(86) PCT No.: PCT/US2022/074967

§ 371 (c)(1),
(2) Date: Feb. 23, 2024

(87) PCT Pub. No.: WO2023/028429

PCT Pub. Date: Mar. 2, 2023

(65) Prior Publication Data

US 2024/0238142 A1 Jul. 18, 2024

Related U.S. Application Data

(60) Provisional application No. 63/236,036, filed on Aug. 23, 2021.

(51) Int. Cl.

| | |
|---|---|
| ***A61G 13/08*** | (2006.01) |
| ***A61G 13/04*** | (2006.01) |
| ***A61G 13/12*** | (2006.01) |

(52) U.S. Cl.

CPC ............ *A61G 13/08* (2013.01); *A61G 13/04* (2013.01); *A61G 13/129* (2013.01)

(58) Field of Classification Search

CPC ...... A61G 13/08; A61G 13/04; A61G 13/122; A61G 13/1225; A61G 13/123; A61G 13/129

USPC ............................................ 5/613, 621, 600

See application file for complete search history.

(56) References Cited

U.S. PATENT DOCUMENTS

| | | | | |
|---|---|---|---|---|
| 6,941,951 B2 * | 9/2005 | Hubert | A61G 13/12 128/845 |
| 7,600,281 B2 * | 10/2009 | Skripps | A61G 13/10 5/624 |
| 8,234,730 B2 * | 8/2012 | Skripps | A61G 13/10 5/621 |
| 11,744,758 B2 * | 9/2023 | Lee | A61G 13/08 5/621 |
| 12,370,113 B2 * | 7/2025 | Lee | A61G 13/129 |
| 2005/0081865 A1 * | 4/2005 | Hubert | A61G 13/0054 128/845 |

(Continued)

FOREIGN PATENT DOCUMENTS

| | | | |
|---|---|---|---|
| JP | 2024532879 A * | 9/2024 | A61G 13/04 |
| LU | 101344 B1 | 12/2019 | |
| WO | WO-2023028429 A1 * | 3/2023 | A61G 13/04 |

*Primary Examiner* — Robert G Santos

(57) ABSTRACT

Patient support board assemblies for holding a patient on a framed operating table such as a so-called Jackson table are provided. A patient support board assembly has a lower board secured to the bed frame and an upper board movably secured to the lower board. The upper board can be rotated, slid, or tilted with respect to the lower board. The upper board is adapted to have one or more patient supports secured thereto.

14 Claims, 11 Drawing Sheets

(56) References Cited

U.S. PATENT DOCUMENTS

| | | | | |
|---|---|---|---|---|
| 2006/0248650 | A1* | 11/2006 | Skripps | A61G 13/0054<br>5/624 |
| 2010/0024128 | A1* | 2/2010 | Skripps | A61G 13/04<br>5/621 |
| 2021/0236369 | A1 | 8/2021 | Lee et al. | |
| 2023/0414435 | A1* | 12/2023 | Lee | A61G 13/122 |
| 2024/0238142 | A1* | 7/2024 | Anderson | A61G 13/12 |

* cited by examiner

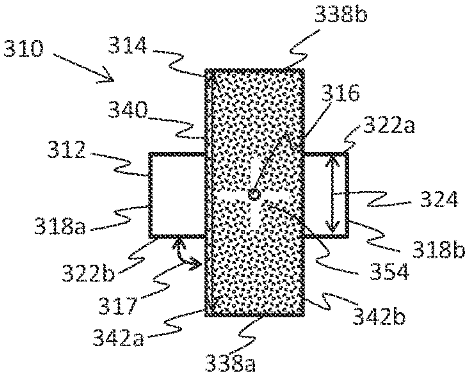
FIG. 3A
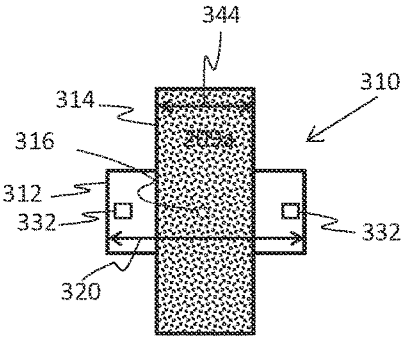
FIG. 3B
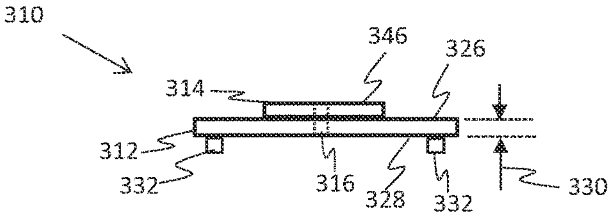
FIG. 3C
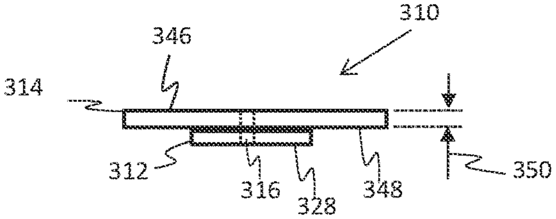
FIG. 3D
FIG. 3E
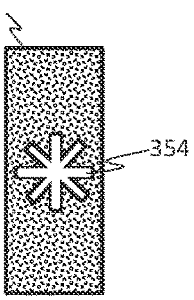
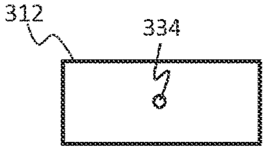
FIG. 3F
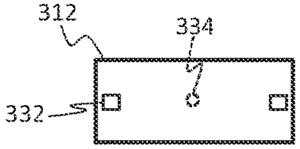
FIG. 3G
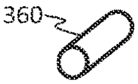
FIG. 3H
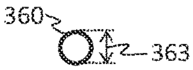
FIG. 3I
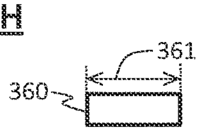
FIG. 3J
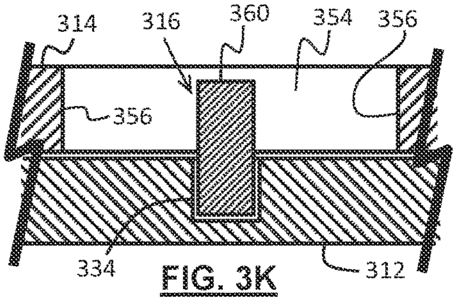
FIG. 3K

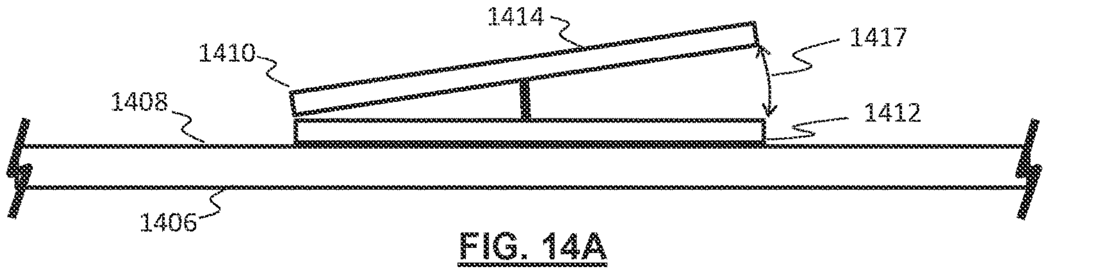
FIG. 14A
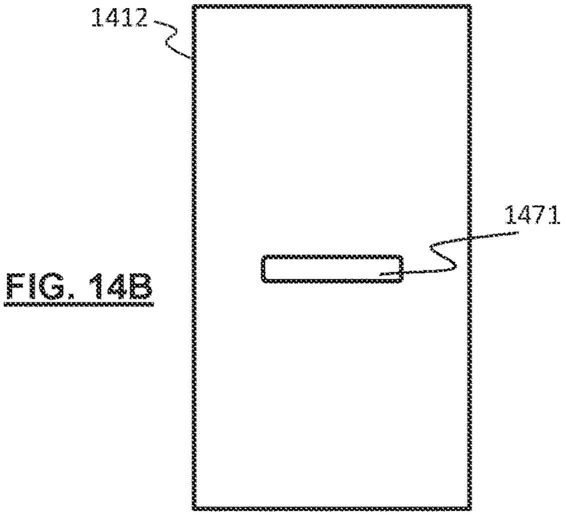
FIG. 14B
FIG. 14C
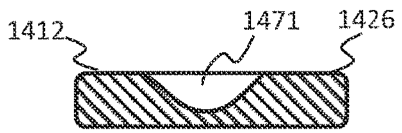
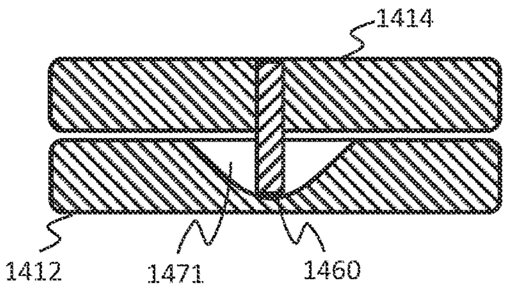
FIG. 14D
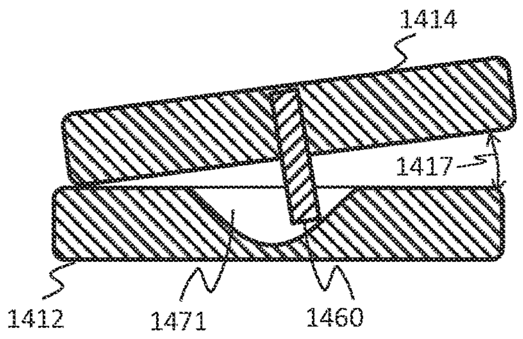
FIG. 14E

SURGERY POSITIONER SYSTEM

CROSS REFERENCE TO RELATED APPLICATIONS

The present application claims priority to U.S. Provisional Patent Application No. 63/236,036, filed on Aug. 23, 2021, which is incorporated by reference as though fully set forth herein.

TECHNICAL FIELD

The present disclosure is directed to devices, systems, and methods for performing surgery on patients. Particular embodiments include methods and apparatuses for securing and supporting a patient on an operating table.

BACKGROUND

The human spine is comprised of a plurality of components (e.g., vertebral bodies, intervertebral discs, posterior bony structures) which collectively protect the spinal cord and enable the normal motions of flexion (bending forward), extension (bending backwards), lateral bending (bending side to side), and rotation (twisting). These normal physiologic motions may be impeded and/or painful when any number of conditions exists, including but not limited to disc degeneration, trauma, and deformity (e.g., scoliosis). Depending upon the condition, surgical intervention may be required to restore the normal physiologic function of the spine at the affected region.

With a patient placed on an operating table, medical personnel may want to modify the position of the patient before, during or after the surgery, such as by tilting the table to effectuate relative rotation of a patient within the sagittal, coronal, and/or axial planes. But such table movement may cause the patient to roll or otherwise move with respect to the table. Various methods and apparatuses are known to attempt to address this issue, including straps, wraps/tape, bracings, and other elements which attempt to hold portions of the patient (e.g., the hips, shoulders, etc.) in a desired position.

SUMMARY

The present disclosure relates to systems, devices, and methods for maintaining a patient in a desired position during treatment procedures such as spinal surgeries.

In one embodiment, a surgical table has one or more board-like structures secured thereto and adapted to hold a patient in a desired position (e.g., supine, prone, lateral) on the table as the table is moved, such as where the table is tilted to effectuate rotation of a patient within the sagittal, coronal, and/or axial planes. The board-like structures may be removably secured to the table, such as via rails (also referred to as beams herein and in the art) which may run (and may even define) the length of the table. Examples of such rails (aka beams) are the rails of a so-called “Jackson table.” The boards/board assemblies may include locking mechanisms to secure the boards/board assemblies to the rails. The locking assemblies may be adapted to allow a user to remove the boards/board assemblies from the rail; to prevent sideways removal of the boards/board assemblies while allowing the boards/board assemblies to slide along the rail; and/or to lock the boards/board assemblies to the rail such that the boards/board assemblies are prevented from sliding along the rails. Some or all elements of the locks may be substantially transparent/translucent to the imaging system, such as by being radiolucent, in order to improve imaging from the imaging system.

The boards may include patient supports, such as padding, etc., on surfaces thereof. The patient supports may be adapted to conform, support, and cushion portions of the patient’s body. The patient supports may serve to improve the holding capability of the table and/or board assemblies for holding the patient in the desired position on the table. Patient supports may be permanently secured to the boards. Patient supports may be removably secured to the board(s), for easy removal and/or attachment by a user. Patient supports of different sizes and shapes (e.g., of different length, width, thickness, shapes) and firmness may be provided for a user to select from and to removably apply to the board(s).

The boards may have one or more peg holes on the upper and/or lower surfaces thereof. One or more of the peg holes may pass all the way through the board(s), or may pass only partially through the board(s). The peg holes may be adapted to slidingly receive one or more pegs and/or other devices adapted to be slidingly (and/or removably) inserted into the peg holes. The peg holes and/or pegs may be used to secure one or more accessories to the boards, such as patient supports, covers, mounting/holding devices (such as mounting devices for surgical arms and cameras), etc. Note that individual accessories may be equipped with pegs adapted to be removably slid into the peg holes, and may include locking mechanisms to hold the accessory pegs in the peg holes to thereby hold the accessory to the bed. When secured to the board(s), the accessories may be positioned above, on top of, below, to the side of, or at any other desired position with respect to the board assembly and/or table.

An operating table of an embodiment may have an open frame formed from one or more beams extending lengthwise with respect to the table.

Embodiments include methods of operating on a patient. Such a method may include providing an operating table such as those disclosed above and elsewhere in this application, and such method may include any combination of one or more or all of the following: positioning the patient on the table bed in a desired position; moving at least one of the upper board or lower board; positioning a patient support; confirming proper positioning of the patient for a desired procedure on the patient; and performing the desired procedure on the patient. Moving the at least one of the upper board or lower board may be performed before, during, or after positioning the patient into a desired position on the table bed.

Methods of the embodiments may be methods for treating a spine of the patient, and confirming proper positioning of the patient for a desired procedure on the patient may involve confirming proper spinal alignment of the patient. The system may be adapted to be selectively repositioned in various selected positions with respect to the table bed, and the method may further involve repositioning at least one of the upper or lower boards with respect to the table bed responsive to the positioning of the patient on the table in order to achieve proper positioning of the patient for the desired procedure on the patient.

Embodiments may include systems for performing surgery on a patient, such as where the patient is in a lateral, prone or supine position. Such a system may include an operating table such as those disclosed above and elsewhere in this application, and such a system may include any combination of one or more or all of the following: an imaging system for providing real-time display of one or more portions of the patient's anatomy; and a monitoring system for monitoring one or more patient functions. The imaging system may include an x-ray system, such as an x-ray fluoroscopy system. Such a system may include a C-arm element. The operating table may be adapted to receive the C-arm element around the table frame so that the C-arm element can be moved over and along a substantial length of the table without obstruction in order to image one or more portions of the patient's anatomy as the patient is on the table. One or more portions of the table may be substantially transparent/translucent to the imaging system, such as by being radiolucent, in order to improve imaging from the imaging system.

Other objects, features, and advantages of the present subject matter will become apparent from a consideration of the following descriptions.

BRIEF DESCRIPTION OF THE DRAWINGS

FIGS. 3A-3D depict top, bottom, end, and side views, respectively, of a board assembly according to embodiments of the present technology;

FIG. 3E depicts a top view of the upper board of the board assembly of FIGS. 3A-3D;

FIGS. 3F and 3G depict top and bottom views of the lower board of the board assembly of FIGS. 3A-3D;

FIGS. 3H-3J depict perspective, top, and side views of the hub rod of the board assembly of FIGS. 3A-3D;

FIG. 3K depicts a close-up side view (cross-sectional) of the hub portion of the board assembly of FIGS. 3A-3D;

FIGS. 7A-7C depict top views of a board assembly according to embodiments of the present technology;

FIG. 14A depicts a side view of a table frame with board assembly according to embodiments of the present technology;

FIGS. 14B and 14C depict top and side (cross-sectional) views of a lower board of a board assembly according to embodiments of the present technology;

FIGS. 14D and 14E depict side (cross-sectional) views of a board assembly according to embodiments of the present technology;

Figure 1:
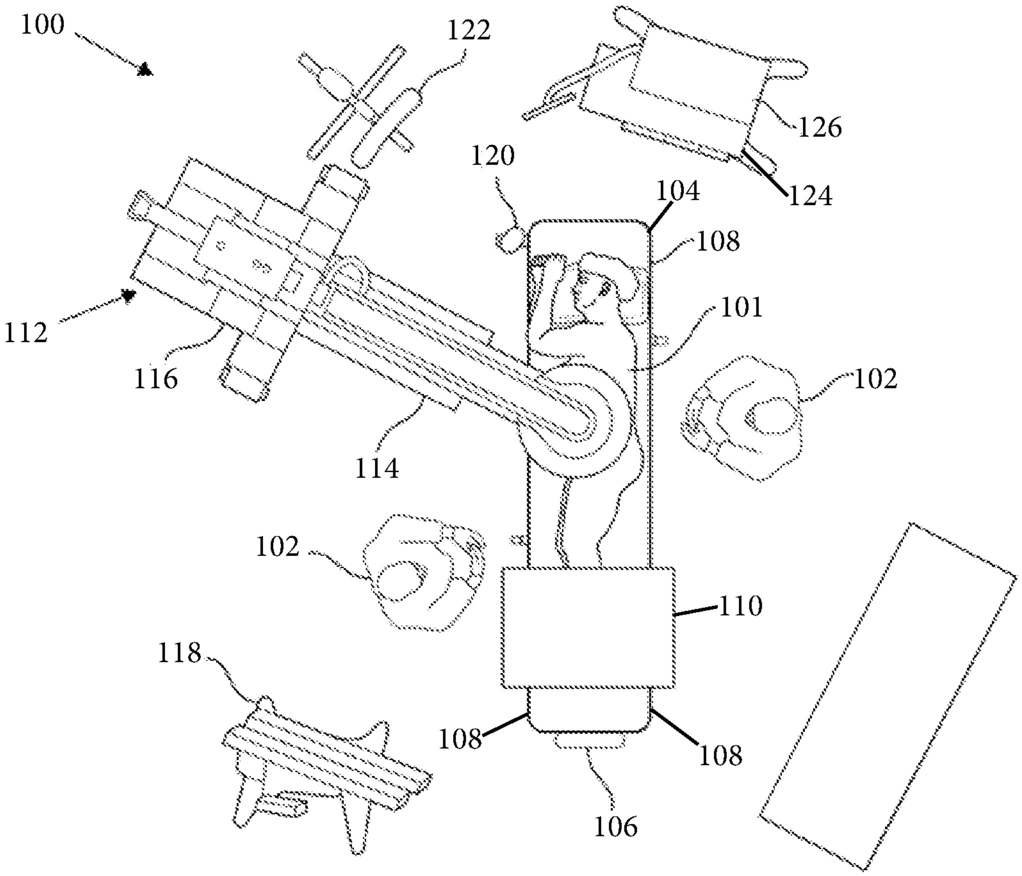
FIG. 1 is a top view of a system for treating a patient.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

A system 100 for treating of a patient 101 is depicted in FIG. 1. Medical personnel 102, such as surgeons and nurses, are also depicted. The system 100 includes an operating table 104 on which the patient 101 is situated, which in the particular image is depicted as in a lateral position. Note that other positions may also be applied, such as supine and prone. The operating table 104 includes a table bed frame 106 comprising table rails 108 to which are secured one or more board assemblies 110. An imaging system 112 such as an x-ray fluoroscopy system includes a C-arm element 114 positioned and adapted to extend over the table 104, with the C-arm element 114 including appropriate imaging elements such as x-ray source and/or receptor. The imaging system 112 includes an image processor 116 which processes signals received from the C-arm element to create images of patient anatomy, with the images provided on monitors 118 for viewing by the medical personnel. Additional imaging systems may be included, such as a camera 120 providing images to a table-side image array 122. Monitoring systems may include a neuromonitoring system 124 and cardiac monitoring system 126.

Figure 2A:
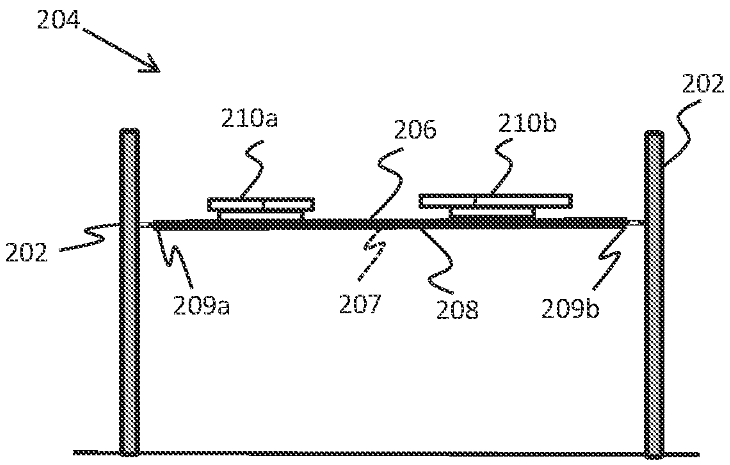
FIGS. 2A and 2B are side and top views of an operating table with board assemblies according to embodiments of the present technology.
Figure 2B:
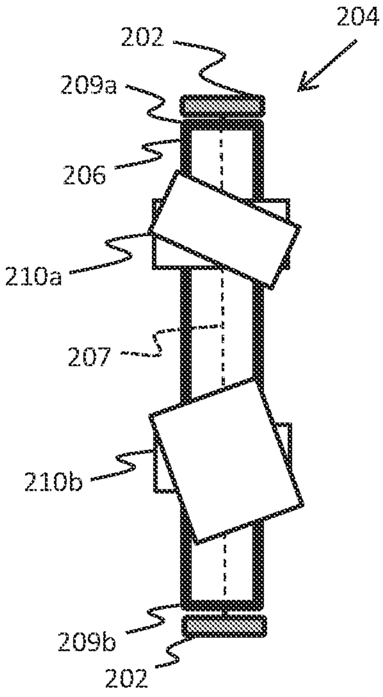

Further details of a table 204 and associated elements according to embodiments of the disclosure are depicted in FIGS. 2A-2B. The table 204 comprises a table bed frame 206 supported by one or more pedestals 202, which may preferably be adjacent opposing ends 209 (such as the head end 209*a* or foot end 209*b*) of the table bed frame 206. This positioning of the support pedestals 202 permits the C-arm or other imaging/monitoring equipment to extend around the table bed frame 206 and around the patient (e.g., for imaging a patient's spinal areas) during treatment procedures. Note that the table bed frame 206 and other elements may preferably be translucent to desired imaging systems, such as by being radiolucent.

The table bed frame 206 may include one or more beams 208, which may be formed of carbon fiber and/or may be substantially radiolucent. The table bed frame 206 may be rotatably secured to the support pedestal(s) 202, thus allowing the table bed frame 206 to be rotated about its longitudinal axis 207. Alternatively, or additionally, the table bed frame 206 may be slidingly secured to the support pedestal (s) 202 to permit up and/or down movement of one or both of the respective table ends 209*a*, 209*b*, thus varying the height of the head end 209*a*, foot end 209*b*, and/or both ends of the table bed frame 206. The securement between the table bed frame 206 and the pedestal(s) 202 may permit the table bed frame 206 to vary in the angle between its longitudinal axis 207 and one or both pedestals.

Although a dual-pedestal table is depicted in FIGS. 2A-2B, embodiments may alternatively include a table having a single pedestal to which the frame is secured and by which the frame is supported. Such a single pedestal table (not shown) may preferably have a table bed frame which is secured to the single pedestal in such a way as to be slid up and down the pedestal to varied the bed frame in height; to rotate the table bed frame about its longitudinal axis; and/or to be tilted so as to vary the angle between the pedestal and the longitudinal axis (thus varying the height of the table bed frame head end with respect to the height of the table bed frame foot end).

The beams 208 may be adapted to receive attachments thereon. According to embodiments of the current technology, one or more board assemblies secured to the rails/beams 208, such as a chest board assembly 210*a* and/or a leg board assembly 210*b* as depicted in FIGS. 2A-2B. The board assemblies 210*a*, 210*b* may be adapted to assist (e.g., via straps, padding or other patient support attachments, etc.) in holding a patient in a desired position on the table 204, such as in a lateral, supine, or prone position, including holding the patient as the table bed frame 206 is rotated, tilted, raised, lowered, or otherwise moved, and/or as one or more of the board assemblies is reconfigured. The board assemblies 210*a*, 210*b* may be adapted to be adjusted in configuration, as discussed below with respect to FIGS. 6A-8C below, etc., to thereby adjust a position of a patient on the table, including adjusting the spinal position of the patient.

The board assemblies 210*a*, 210*b* may be adapted to be releasably secured to the beams 208 and may have a locked configuration wherein each board assembly 210*a*, 210*b* is locked to the beam(s) 206 in position at a specific location along the length of the table bed frame 206.

FIGS. 3A-3D depict an illustrative board assembly 310 having a lower board 312 movably secured to an upper board 314 in selectively movable configuration via a hub 316. FIGS. 3E-3J depict individual elements the board assembly 310. The lower board 312 has opposing lower board sides 318*a*, 318*b* with an overall lower board width 320 therebetween; opposing lower board ends 322*a*, 322*b* with an overall lower board length 324 therebetween; and a lower board top surface 326 and lower board bottom surface 328 with an overall lower board thickness 330 therebetween.

The upper board 314 is selectively movable, e.g., via rotation and/or sliding (lateral or lengthwise), with respect to the lower board 312. For example, the upper board 314 may be rotated about the hub 316 with respect to the lower board 312 by an angle 317, which in the particular depiction is 90 degrees. Note that other angles are also within the scope of the disclosure. Depending on the particular embodiment, the upper board 314 can be rotated through a full 360 degrees with respect to the lower board 312.

The lower board 312 may have one or more rail locks 332, which in the embodiment depicted are positioned at or adjacent the opposing lower board ends 318*a*, 318*b*. The rail locks 332 are adapted to releasably secure the lower board 312 to the one or more rails of an operating table frame, such as that depicted in FIGS. 1 and 2. The rail locks 332 may be adapted for activation by a user, such as via a locking handle (not shown), to lock and unlock the lower board 312 from the rail(s), such as for securing, positioning, and/or removing the lower board 312.

The lower board 312 may have a hub-engaging hole 334 passing at least partially therethrough, with the hub-engaging hole adapted to receive a rod or other element of the hub 316. The lower board 312 may have one or more lower board peg holes 336 passing at least partially therethrough. One or more of the lower board peg holes 336 may have an opening in the lower board top surface 326, in the lower board bottom surface 328, or both. In the case where one or more of the lower board peg holes 336 pass completely through the lower board 312 from lower board top surface 326 to lower board bottom surface 328. The lower board 312 may have as many peg holes 336 as possible without compromising the strength and/or stiffness of the lower board 312. The lower board peg holes 336 may be adapted to slidingly and/or rotatably (e.g., in screw-like fashion) or otherwise receive an apparatus therein, such as by receiving peg of an attachment. Lower board peg holes 336 may be smooth bored. Lower peg holes 336 may include other elements on the inner surface thereof, such as inward projections or outward notches, which are adapted to engage against corresponding coupling elements of a peg of an attachment. For example, one or more lower board peg holes 336 may include one or more threaded elements adapted to receive a screw element of a peg of an attachment. Lower peg holes may include locks adapted to selectively lock pegs therein.

The upper board 314 has opposing upper board ends 338*a*, 338*b* with an overall upper board length 340 therebetween; opposing upper board sides 342*a*, 342*b* with an overall upper board width 344 therebetween; and an upper board top surface 346 and upper board bottom surface 348 with an overall upper board thickness 350 therebetween. The upper board 314 may preferably have an upper board hub opening 354, which may pass fully (as depicted) or at least partially through the upper board 314. The upper board hub opening 354 is adapted to engage with the hub and permit rotation The upper board 314 may have one or more upper board peg holes 352 passing at least partially therethrough. Each of the upper board peg holes 352 may have an opening in the upper board top surface 346, an opening in the upper board bottom surface 348, or an opening in both such surface (in the case where an upper board peg hole 352 passes completely through the upper board 314 from upper board top surface 346 to the upper board bottom surface 348). The upper board 314 may have as many peg holes 352 as possible without reducing the strength and/or stiffness of the upper board 314. The upper board peg holes 352 may be adapted to slidingly and/or rotatably (e.g., in screw-like fashion) or otherwise receive an apparatus therein, such as by receiving a peg or other projecting element of an attachment. Upper board peg holes 352 may be smooth bored. Upper board peg holes 352 may include other elements on the inner surface thereof, such as inward projections and outward notches, which are adapted to engage against corresponding coupling elements of a peg of an attachment. For example, one or more upper board peg holes 352 may include one or more threaded elements adapted to receive a screw element of a peg of an attachment. Upper board peg holes may include locks adapted to selectively lock pegs therein.

The lower board 312 and/or upper board 314 of a board assembly 310 may have sufficient strength, alone or in combination with other board assemblies secured to the bed frame, to support the weight of a patient secured thereto. The lower board 312 and/or upper board 314 of a board assembly 310 may have sufficient rigidity to support the weight of a patient secured thereto without noticeable deformation.

Note that the peg holes 336 of the lower board 312 may arranged in a pattern which matches, in peg spacing, peg positioning, and/or peg hole size, a pattern of the peg holes 352 of the upper board 314.

The hub 316 of the particular embodiment may include a rod 360 having a length 361 and a diameter/width 363, as depicted in FIGS. 3H-3J.

The hub 316 is depicted in greater detail in FIG. 3K. The rod 360 is fixedly seated in the hub-engaging hole 334 of the lower board 312. Note that the rod 360 may be permanently secured within the lower board hub-engaging hole 334 or may be releasably secured therein. The rod 360 extends upwardly into the hub opening 354 of the upper board 314. The upper board hub opening 354 is adapted to accommodate the rod 360 at various positions therein, thus allowing the upper board 314 to be repositioned with respect to the lower board 312 at positions which correspond to repositioning (e.g., sliding) of the hub opening 354 around rod 360. For example, in the depiction of FIG. 3K, the upper board 314 can be slidingly repositioned left-to-right and right-to-left with respect to the lower board 312, but with the sliding limited by the rod 360 engaging against an end 356 (e.g., left end, right end) the hub opening. The rod 360 may further permit the upper board 314 to rotate (e.g., freely) about the hub 316 with respect to the lower board 312.

Dimensions of elements of a board assembly according to embodiments depends on the particular application. For example, a lower board may preferably have sufficient length to extend between opposing rails/beams of a Jackson table frame. An upper board may preferably have sufficient length and width to provide sufficient surface space for proper positioning of any patient supports and/or other attachments on the upper board.

Figure 4A:
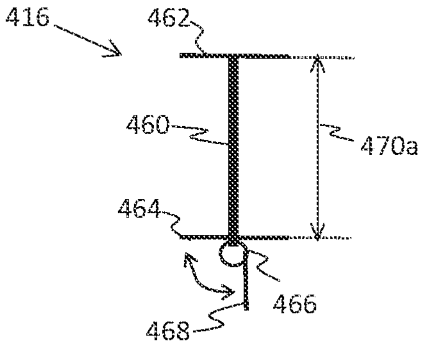
FIGS. 4A-4B depict side views of a board-to-board lock according to embodiments of the present technology.
Figure 4B:
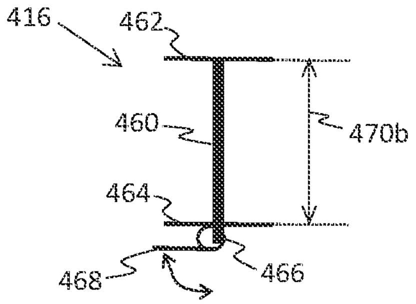
Figure 4C:
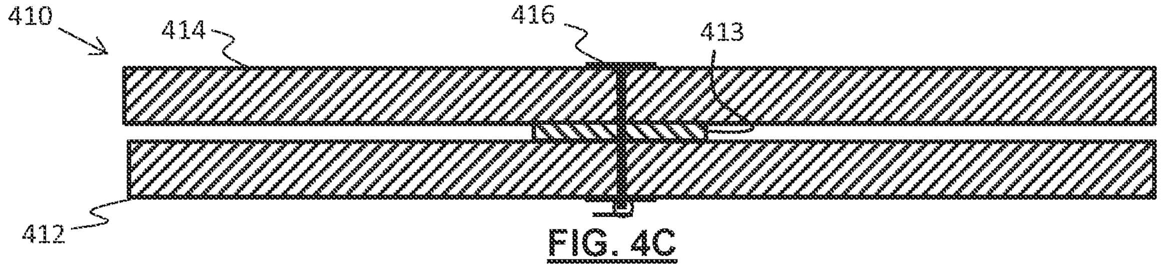
FIGS. 4C-4F depict side views (cross-sectional) of a board assembly according to embodiments of the present technology.

Other hubs, including locking hubs, are also within the scope of the embodiments. For example, as depicted in greater detail in FIGS. 4A-4C, a hub 416 according to embodiments may be a compressive mechanism which urges the upper board 414 toward the lower board 412. The hub 416 may serve as a lock that secures the upper board 414 at a desired position (e.g., rotational, lengthwise, sideways) with respect to the lower board 412 by compressing the upper board 414 toward (i.e., against) the lower board 412. Note that the upper and lower boards 412, 414 may be engaged directly against each other by the locking hub 416, and/or via one or more intervening elements, such as the spacer 413 depicted in FIG. 4C.

A locking hub 416 may be adapted to releasably hold an upper board 414 at a particular position with respect to a lower board 412. For example, the hub 416 may have an unlocked configuration wherein the upper board 414 is rotatably and/or slidingly and/or laterally movable with respect to the lower board 412, and a locked configuration wherein the upper board 414 is prevented from the previously-allowed movement with respect to the lower board 412 (e.g., rotatably and/or slidingly and/or laterally movement) of the unlocked configuration.

The locking hub 416 depicted has a central rod 460 secured at one end to an upper plate 462, with rod 460 slidingly passing through a hole in a lower plate 464 such that an opposing end of the rod 460 is positioned on an opposite side of the lower plate 464 from the upper plate 462. A rocker 466 is rotatably secured at the opposing end of the rod 460. A handle 468 is secured to the rocker 466, with the handle 468 adapted to be moved through an angle 470 which in turn rotates the rocker 466. The upper plate is engaged against or otherwise secured to the upper board (e.g., engaged against a top surface of the upper board), while the lower plate is engaged against or otherwise secured to the lower board (e.g., engaged against a bottom surface of the lower board). With the handle in the unlocked configuration, such as that depicted in FIG. 4A, the distance **470*a* between the upper plate 462 and lower plate 464 is sufficient to accommodate the thicknesses of both the upper board 414 and lower board 412 (as well as any intervening structures) without compressing the boards 412, 414 strongly together. In the unlocked configuration, the boards 412, 414 can rotate and/or slide (lengthwise and/or sideways) with respect to each other. As the handle 468 is rotated toward the lower plate 464, the rocker 466 engages against and moves the lower plate 464 toward the upper plate 462. The lower plate 464 and upper plate 462 are now separated by distance 470*b*, less than distance 470*a*, and the lower and upper boards 412, 414 are compressed toward each other with sufficient strength to lock the lower and upper boards 412, 414 in a desired position with respect to each other. In the locked configuration, the boards 412, 414** cannot rotate and/or slide (lengthwise and/or sideways) with respect to each other.

Note that upper plate 462 in the embodiments depicted is on (e.g., flush with) the upper board top surface 446, and has sufficient dimensions (e.g., diameter, width, etc.) to prevent its accidental passage through the upper board rod hole 454. Similarly, lower plate 464 in the embodiments depicted is on (e.g., flush with) the lower board bottom surface 428, and has sufficient dimensions (e.g., diameter, width, etc.) to prevent its accidental passage through the lower board rod hole 434. Note that upper plate 462 could be secured (e.g., fixedly or rotationally) to (e.g., on or within) upper board 414, depending on the embodiments. Similarly, lower plate 464 could be secured (e.g., fixedly or rotationally) to (e.g., on or within) lower board 412, depending on the embodiments.

The locking hub or other locking mechanism may be adapted to be selectively activated by a user to be moved between the locked configuration and the unlocked configuration and vice-versa. The user can move the lock to the unlocked configuration; then rotate and/or slide (e.g., lengthwise and/or laterally) the upper board to reposition the upper board with respect to the lower board. Once a desired position of the upper board is achieved, the user can engage the lock to the locked configuration, thereby locking the upper board in the desired position. Note that repositioning of the boards with respect to each other can occur prior to positioning of the patient on the table; concurrent with positioning of the patient on the table; and/or after positioning of the patient on the table (e.g., during a surgical procedure). Multiple positioning and repositioning of the boards and/or patient can occur before and/or during and/or after a procedure.

Figure 4D:
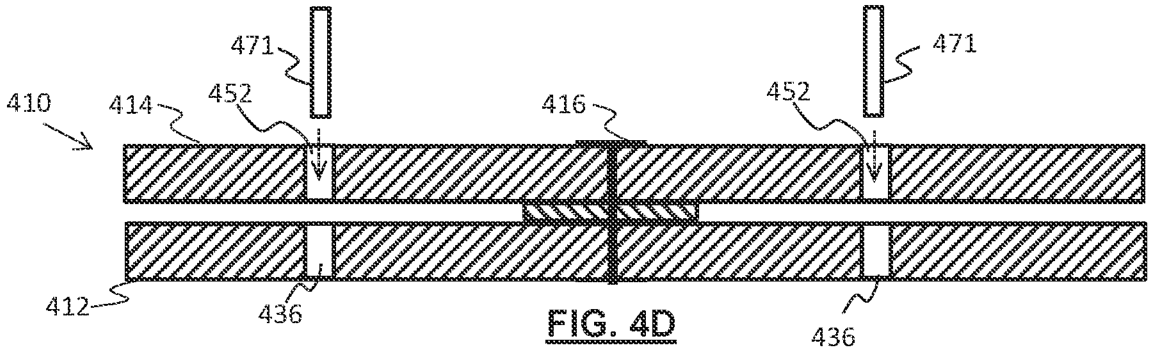
Figure 4E:
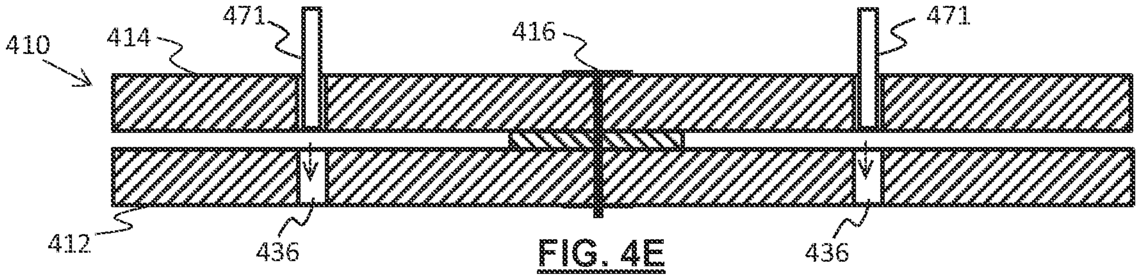
Figure 4F:
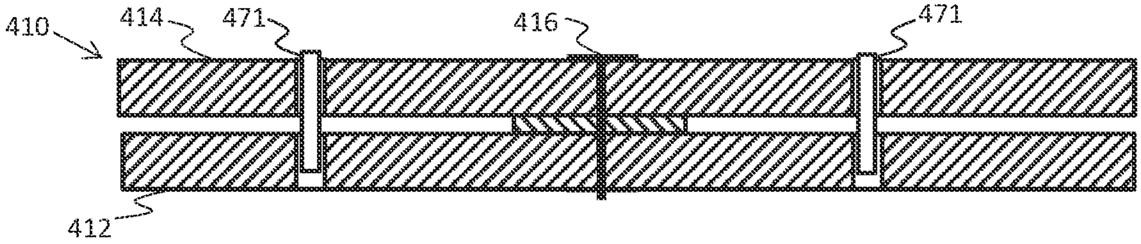

Note that other hubs and/or locking mechanisms are within the scope of embodiments. For example, as depicted in FIGS. 4D-4F, one or more pegs 471 may serve as locks in a board assembly 410. A user can position the upper board 414 as desired with respect to the lower board 412, which may include aligning one or more upper board peg holes 452 with lower board peg holes 436. Each of the one or more pegs 471 has sufficient length to extend from the upper board 414 to the lower board 412. The pegs are inserted into aligned sets of peg holes 452, 436 to extend from the upper board 414 to the lower board 412. For example, each peg 471 may be inserted into an upper board peg hole 452, as depicted in FIG. 4E, and further advanced into a lower board peg hole 436 until it is positioned within an upper board peg hole 452 and within a lower board peg hole 436, as depicted in FIG. 4F. (Note that this peg insertion could be reversed, with a peg inserted first into a lower board peg hole and then advanced upward into an aligned upper peg hole.) The one or more pegs 471 thus serve as locks to hold the upper board 414 in position with respect to the lower board 412. To unlock the boards, the one or more locking pegs 471 are removed from at least one peg hole (e.g., upper board peg hole and/or lower board peg hole), such as by being slidingly removed at least an upper board peg hole or a lower board peg hole.

Other configurations of board-to-board locks, such as screw-like attachments between boards, peg-like engaging elements extending between boards, etc., are also within the scope of various embodiments. Also, board-to-board locks according to the embodiments may have different configurations where some degrees of movement are permitted while others are prevented. For example, as in the embodiment of FIGS. 4A-4B, a board-to-board lock may have an unlocked configuration where rotation and sliding (sideways and lengthwise) movement between boards is allowed, and a locked configuration where rotation and sliding (sideways and lengthwise) movement between boards is prevented. Board-to-board locks of embodiments may include other configurations, such as where rotation is allowed but sliding (sideway and/or lengthwise) is prevented; where sliding (sideways and/or lengthwise) is allowed but rotation is prevented; where one form of sliding (sideways and/or lengthwise) is allowed but the other is prevented; etc. Such configurations may involve locks with separate locking elements, such as one lock for rotational control, one lock for sideways sliding control, one lock for lengthwise sliding control, etc. Board-to-board locks may include electromagnets or other types of locking mechanisms. Board-to-board locks may include one or more gears and/or electric motors which can be activated to selectively rotate and/or slide (sideways and/or lengthwise) one board with respect to the other.

Board-to-board locks may be adapted to permit relative movement of boards which is confined to a plane parallel to the plane of an adjacent board. For example, a board may be rotated and/or slid (lengthwise and/or laterally) in a plane parallel to the top or bottom surface of the adjacent board.

Figures 5A, 5B, 5C, 5D:
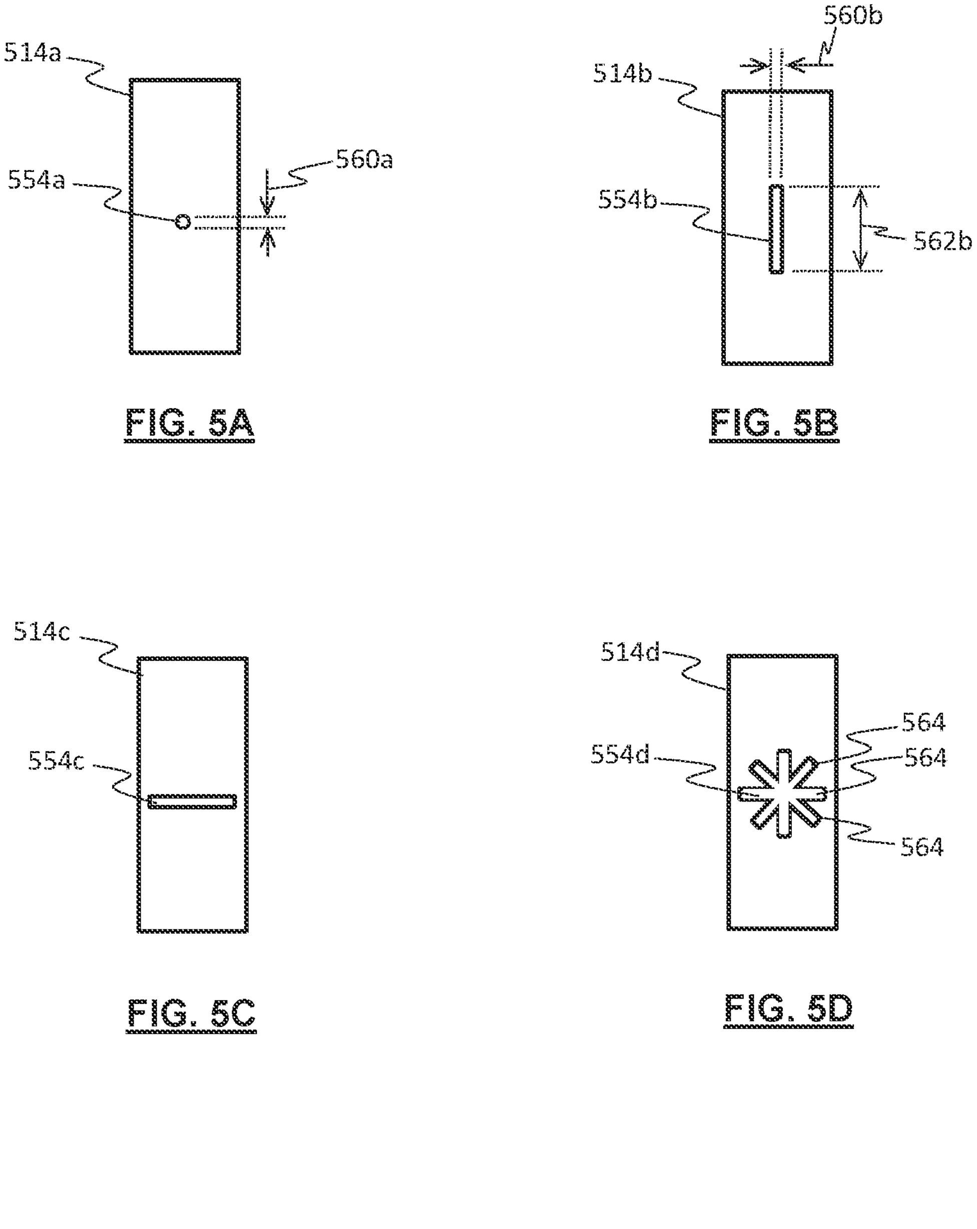
FIGS. 5A-5D depict top views of boards according to embodiments of the present technology.

Boards of the assemblies may include elements adapted to engage and cooperate with the lock to control (e.g., guide/direct) the rotating and/or sliding and/or lateral movement of the upper board. For example, as depicted in FIG. 5A, an upper board 514*a* may include a simple round hole 554*a* therethrough, which has a hole diameter 560*a* sufficiently large to receive a rod or other element of a lock (such the rod 360 of lock 316 of FIGS. 4A-4B). The simple round hole 554*a* permits a single degree of movement, namely rotational movement of the upper board 514*a* with respect to a lower board (such the lower board 312 of FIGS. 3A-3D).

As depicted in FIG. 5B, an upper board 514*b* may include an opening 554*b* in the form of a simple slot, having a slot width 560*b* sufficiently large (i.e., at least as large as a diameter of a lock rod passing therethrough) in order to receive the lock rod therethrough. The simple slot opening 554*b* has a slot length 562*b*, which in the embodiment depicted is greater than the slot width 560*b*. The simple slot opening 554*b* thus permits rotation of the upper board 514*b* about the rod/lock and with respect to a lower board, and permits sliding of the upper board 514*b* along the length 562*b* of the slot opening 554*b*. Note that the slot 554*b* runs lengthwise along the upper board 514*b* (i.e., parallel to the length of the upper board 514*b*). The slot thus affords 2 degrees of motion of the upper board 514*b* with respect to a lower board, namely rotational movement and lengthwise sliding movement. Note that a rod of the lock could be adapted to prevent rotation while allowing sliding movement with respect to a slot opening, such as where a rod has an elongated cross-section when viewed down its length (i.e., perpendicular to a top surface of a board having the slot opening), with the rod elongated cross-section having a minor dimension as small as or smaller than the slot width and a major dimension larger than the slot width. Such a configuration would provide for a single degree of movement of the upper board 514*b*, namely sliding movement along the length of slot opening, while preventing rotation of the board 514*b*.

A simple slot opening 554*c* may be positioned non-parallel to the length of the upper board 514*c*, such as at 90 degrees to the length of the board 514*c* as depicted in FIG. 5C. Note that other angles between 0 and 90 degrees to the length of the board are also within the scope of embodiments. In the embodiment depicted in FIG. 5C, the simple slot opening 554*c* permits rotation of the upper board 514*c* about the rod/lock and with respect to a lower board, and permits sideways (lateral) sliding of the upper board 514*c* along the length of the slot opening 554*c*. The slot thus affords 2 degrees of motion of the upper board 514*c* with respect to a lower board, namely rotational movement and sideways (lateral) sliding movement. Note that a rod of the lock could be adapted to prevent rotation while allowing sliding movement with respect to a slot opening, such as where a rod has an elongated cross-section when viewed down its length (i.e., perpendicular to a top surface of a board having the slot opening), with the rod elongated cross-section having a minor dimension as small as or smaller than the slot width and a major dimension larger than the slot width. Such a configuration would provide for a single degree of movement of the upper board 514*c*, namely sliding movement sideways with respect to the length of the upper board 514*c*, while preventing rotation of the upper board 514*c*.

As depicted in FIG. 5D, the upper board 514*d* may include a more complicated pattern such as a plurality of intersecting slots 564, which may form an overall asterisk-like shaped opening 554*d*. The intersecting slots thus permit rotation of the upper board 514*d* about a lock/rod and lower board, and permits sliding of the upper board 514*d* in multiple directions (e.g., the directions defined by the lengths of the various intersecting slots 564) with respect to the lock/rod and lower board. Note that in the embodiment depicted, adjacent slots are at 45 degrees to each other around the opening 554*d*, with one slot parallel to, one slot at 90 degrees from, and two slots at 45 degrees (measured from leading or trailing portion of the slot) from the length of the board 514*d*. The multiple-slot opening 554*d* thus affords 3 types of motion of the upper board 514*d* with respect to the lower board, namely rotational movement and sliding movement and lateral movement thereof. Other angles between adjacent slots are also within the scope of the embodiments.

In the embodiments of FIGS. 5A-5D, the movement-permitting holes 514*a*-514*d* (e.g., round holes and/or slots) are positioned in the upper board of a board assembly. However, note that these or similar holes and/or slots may alternatively, or additionally, be positioned in a lower board of a board assembly, thereby allowing respective movements in various degrees between the upper board and lower board.

Figure 6A:
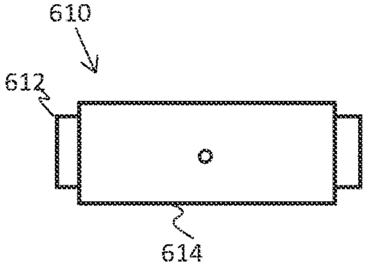
FIGS. 6A-6C depict top views of a board assembly according to embodiments of the present technology.
Figure 6B:
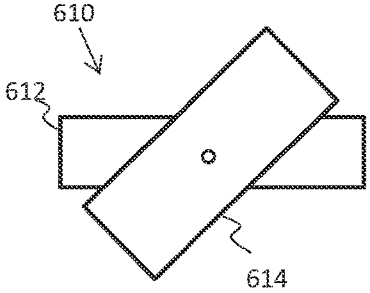
Figure 6C:
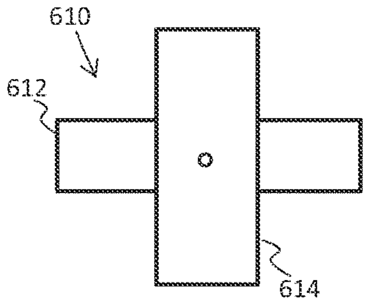

FIGS. 6A-6C depict a board assembly 610 in various rotational positions of an upper board 614 with respect to a lower board 612. In FIG. 6A, the upper board 614 is substantially parallel to the lower board 612. FIG. 6B depicts the upper board 614 rotated at an angle 620*b* of about 45 degrees from the lower board 612. FIG. 6C depicts the upper board 614 rotated at an angle 620*c* of about 90 degrees from the lower board 612. Note that other angles are also within the scope of embodiments, with the particular angle selected by a user based on parameters such as the patient size and shape as well as the particular procedure(s) being performed on the patient.

Figure 7A:
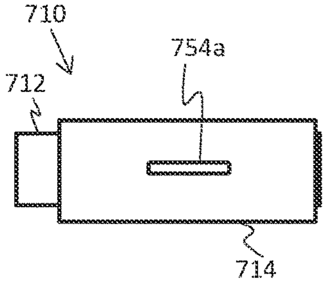
Figure 7B:
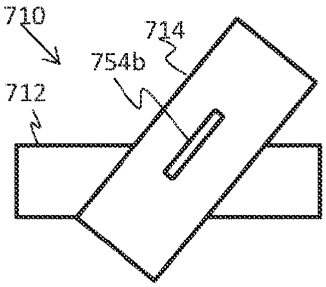
Figure 7B:
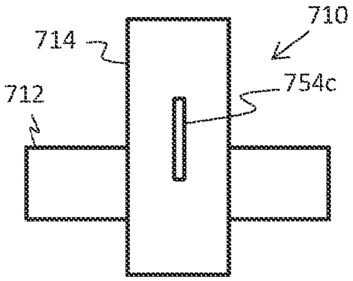

FIGS. 7A-7C depict a board assembly 710 in various rotational and sliding positions of an upper board 714 with respect to a lower board 712. In FIG. 7A, the upper board is substantially parallel to the lower board and is slid lengthwise via slotted opening 754*a*. FIG. 7B depicts the upper board 714 rotated at about 45 degrees from the lower board 712 and slid lengthwise via slotted opening 754*b*. FIG. 7C depicts the upper board 714 rotated at about 90 degrees from the lower board 712 and slid lengthwise via slotted opening 754*c*. Note that the direction of "lengthwise" is the direction which is parallel to the length of the upper board 714. Note that other angles and/or lengthwise sliding positions are also within the scope of embodiments, with the particular angles and/or lengthwise sliding selected by a user based on parameters such as the patient size and shape as well as the particular procedure(s) being performed on the patient.

Figure 8A:
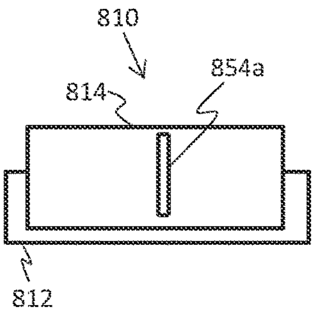
FIGS. 8A-8C depict top views of a board assembly according to embodiments of the present technology.
Figure 8B:
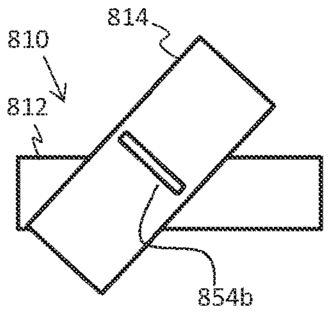
Figure 8C:
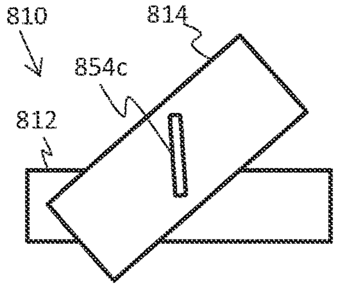
Figure 9A:
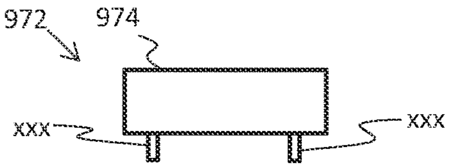
FIGS. 9A-9D depict side, top, end, and bottom views of a patient support according to embodiments of the present technology.
Figure 9B:
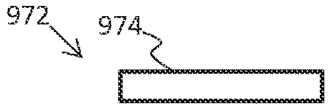
Figure 9C:
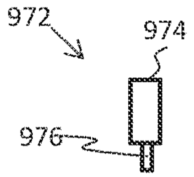
Figure 9D:
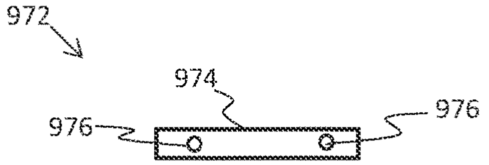

FIGS. 8A-8C depict a board assembly 810 in various rotational and sliding and lateral positions of an upper board 814 with respect to a lower board 812. In FIG. 8A, the upper board 814 is substantially parallel to the lower board 812 and is laterally displaced, e.g., using a slotted opening 854*a* extending perpendicular to the length of the upper board. FIG. 8B depicts the upper board 814 rotated at about 45 degrees from the lower board 812 and laterally displaced, e.g., using a slotted opening 854*b* extending substantially perpendicular to the length of the upper board. FIG. 8C depicts the upper board 814 rotated at about 45 degrees from the lower board 812 and slidingly and laterally displaced, e.g., using a slotted opening 854*c* extending at an acute angle (e.g., 45 degrees) from the length of the upper board. Note that other angles and/or lengthwise sliding and/or sideways (lateral) sliding positions are also within the scope of embodiments, with the particular angles and/or lengthwise sliding and/or sideways (lateral) sliding selected by a user based on parameters such as the patient size and shape as well as the particular procedure(s) being performed on the patient. Note that the direction of "lengthwise" is the direction which is parallel to the length of the upper board 814, and the direction of "laterally" is the direction which is substantially perpendicular to the length of the upper board 814.

Patient supports (e.g., cushioning) may be secured to the top board and/or bottom board of a board assembly, such as at the top surfaces of the board(s). Such patient supports may preferably be adapted to engage against a patient and to provide a comfortable and supportive surface against which portions of the patient's body (e.g., the head, side, hips, back, shoulders, stomach, arms, legs, etc.) can engage against and/or be secured. For example, as depicted in FIGS. 9A-9D, a patient support 972 has main body 974 and attachment pegs 976. The main body 974 may preferably be adapted (e.g., in size and shape and firmness/softness) to engage against (and in some embodiment to conform to and/or support) one or more portions of a patient's anatomy. The embodiment depicted in FIGS. 9A-9D has a relatively simple rectangular-shaped main body 974, but other shapes are within the scope of the embodiments. The main body 974 may preferably provide sufficient support to help hold a patient in place on an operating table. The main body 974 may include padding/cushioning on or adjacent one or more exterior surfaces thereof. The attachment pegs 976 are adapted (e.g., via size and shape) to be advanced into peg holes of a board in order to assist in holding the patient support 972 to the board assembly.

Figure 10A:
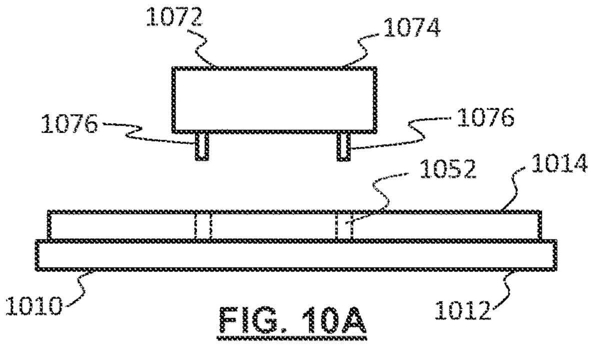
FIGS. 10A and 10B depict side views of a patient support with a board assembly according to embodiments of the present technology.
Figure 10B:
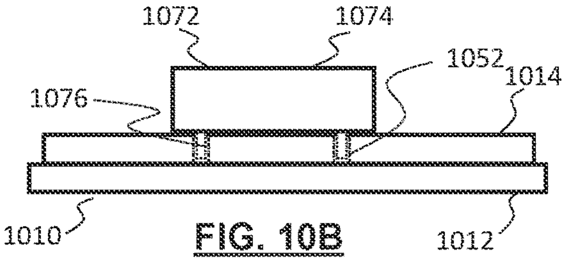

As shown in FIGS. 10A-10B, a patient support 1072 may be secured to a board assembly 1010, such as by being secured to an upper board 1014 of the board assembly 1010. The patient support 1072 is secured (e.g., removably secured) to the upper board 1014 via patient support pegs 1076, which align with and slide into peg holes 1052 in the upper board 1014. Note that patient supports may also, or alternatively, be secured to the lower board 1012.

Figure 11A:
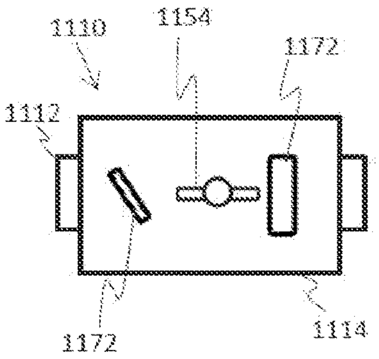
FIGS. 11A and 11B depict top views of a board assembly with patient supports according to embodiments of the present technology.
Figure 11B:
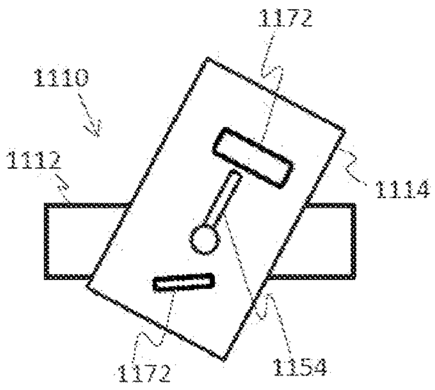

One or more patient supports 1172, which may have different sizes and/or shapes, may be secured to a board assembly 1110 at desired locations, as depicted in FIG. 11A. As depicted n FIG. 11B, the upper board 1114 can be rotated and/or slid with respect to the lower board 1112, and then locked in place, in order to reposition the patient supports 1172 to desired locations for proper support of the patient's anatomy.

Positioning and securing of a patient on a table of the disclosure may include: securing one or more board assemblies to an operating table, such as a so-called "Jackson table" or other table having rails/beams to which a board assembly is adapted to be attached (which may include securing a rail locking element of a lower board to one or more of the rails/beams); securing a patient support to the board assembly, such as to the upper and/or lower boards thereof; and positioning the patient on the table with one or more patient anatomical features engaging against the one or more patient supports. Positioning and securing may also include securing the patient to the table/board assembly vie one or more straps which extend around the patient and hold the patient against one or more of the patient supports.

Figure 12A:
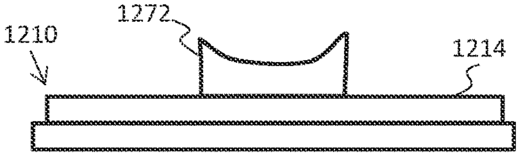
FIGS. 12A-12D depict side views of a patient support with a board assembly and patient according to embodiments of the present technology.
Figure 12B:
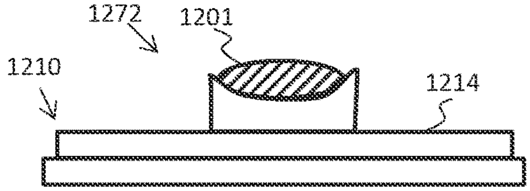
Figure 12C:
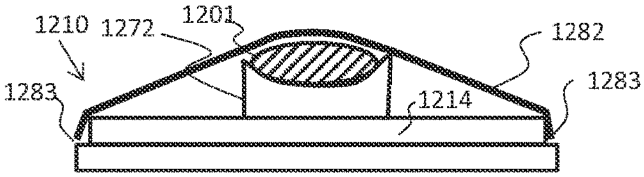

FIGS. 12A-12C depict, in schematic form, aspects of securing a patient to a board assembly 1210 and against a patient support 1272, where the board assembly is secured to an operating table (not shown). As depicted in FIG. 12A, a patient support 1272 has been secured to an upper board 1214 of a board assembly 1210, such as via pegs inserted into peg holes. In FIG. 12B, a portion of the patient 1201 is positioned against the patient support 1272.

As depicted in FIG. 12C, a strap 1282 is passed around the patient 1201, tightened against the patient 1201 (and potentially directly against the patient support 1272 as well), and fastened at opposing ends 1283 to the board assembly 1210 (and/or to the corresponding operating table, such as to the frame thereof). Straps may be secured via pegs or other elements secured to peg holes of a board assembly. Note that a strap may pass entirely around the patient, the patient support, and/or a portion of the board assembly to form a continuous loop, with the strap tightened to hold the patient against the patient support and/or to hold the patient support against the board assembly. Note that a strap could be applied and/or tightened before, during, or after repositioning of the board assembly (e.g., rotation and/or sliding of top board with respect to bottom board).

Figure 12D:
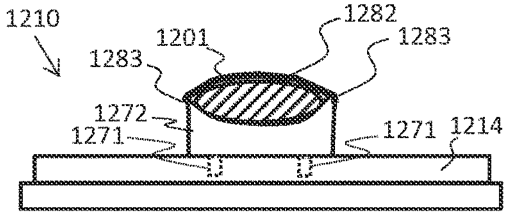

FIG. 12D depicts a strap 1282 is passed around the patient 1201, tightened against the patient 1201, (and potentially directly against the patient support 1272 as well), and fastened at opposing ends 1283 to the patient support 1272. The patient support 1272 is secured to the upper board 1214 via pegs 1271, which may be locking pegs releasably secured to corresponding peg holes in the upper board 1214.

Pegs 1271 which hold a patient support 1272 may be hinged pegs which allow the patient support to shift its position with respect to a lower portion of the peg (i.e., the portion which is secured within a peg hole) to better align a surface of the patient support with the patient. Note that straps may be secured via ratcheting elements adapted to selectively tighten and hold the straps.

Figure 13A:
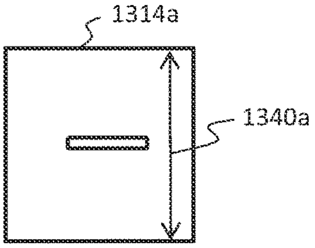
FIGS. 13A-13E depict top views of a board according to embodiments of the present technology.
Figure 13B:
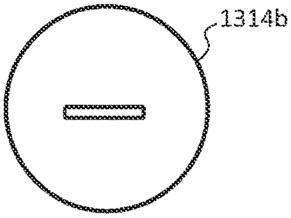

Boards and board assemblies of embodiments may have varying dimensions and/or shapes, depending on the particular application. For example, a board can be a rounded shape, such as an oval or circle. FIG. 13A depicts a lengthened upper board 1314*a* having length 1340*a* sufficient to accommodate and/or support one or more legs of a patient.

Boards do not have to be simple rectangles. For example, a board can be a rounded shape, such as an oval or circle. FIG. 13A depicts a circular top board 1314*a*.

Figure 13C:
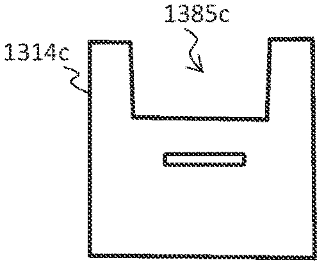
Figure 13D:
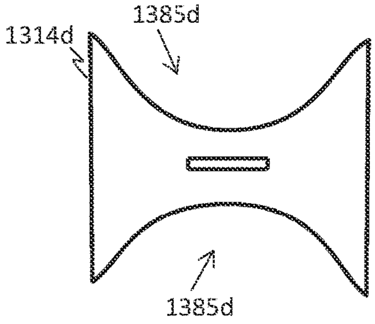
Figure 13E:
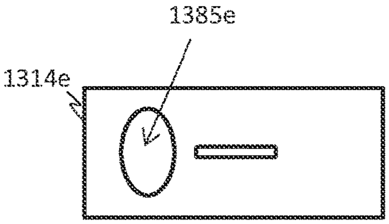

Boards may include cutouts, such as cutouts adapted to accommodate one or more patient body portions, e.g., an arm/elbow, a shoulder, a hip, a leg, etc. For example, a cutout may be included into/through which a portion of the patient (e.g., an arm) could be advanced when positioning the patient on the board assembly. FIG. 13C depicts an upper board 1314*c* having a side/end cutout 1385*c* which can accommodate one or more patient body portions. FIG. 13D depicts an hourglass-shaped upper board 1314*d* with 2 side/end cutouts 1385*d* on opposing sides thereof. Cutouts adapted to accommodate patient body portions may be positioned within a perimeter of a board, such as in the substantially rectangular upper board 1314*e* with oval cutout 1385*e* depicted in FIG. 13E.

A board assembly 1410 may be adapted for tilting of an upper board 1414 with respect to a lower board 1412 by a desired angle 1417, as shown in FIG. 14A. The upper board 1414 is depicted tilted in a direction parallel to a rail 1408 of a table frame 1406. Note that other directions of tilt are also within the scope of the embodiments, such as tilting in a direction perpendicular or otherwise non-parallel with a rail 1408. Such upper board tilting can be useful for sagittal plane adjustment for a patient in a prone position on a table, such as where a patient is in a prone position during lordosis treatment.

FIGS. 14B-14C depict an example of a lower board 1412 having a lower board hub-engaging hole in the form of a slot 1434 having a shaped bottom surface with varying depth along the length of the slot 1434. A board assembly 1410 with such a slotted lower board 1412 permits tilting of the upper board 1414 with respect to the lower board 1412, as depicted in FIGS. 14D-14E. The slot 1434 restrains the hub rod 1460 from movement in one direction (i.e., the direction perpendicular to the length of the slot) but permits hub rod 1460 to move along the length of the slot 1434. Because the depth of the slot 1434 varies along the length thereof, the rod 1460 can be displaced upward and/or angled from the vertical, thus allowing the upper board 1414 to be tilted with respect to the lower board 1412. Note that the bottom surface (profile) of the slot 1434 could include steps (not shown) or other indentations/projections to assist in holding the rod 1460 at the desired position, such as the position shown in FIG. 14E.

Other mechanisms for achieving desired tilting of an upper board are also within the scope of the embodiments. For example, an upper board could have a hinged upper portion which could tilt upward, via the hinge, at an angle away from a lower portion of the upper board. An electric motor and associated gears (not shown) could be used to move the upper board with respect to the lower board, including tilting movement (and/or rotational and/or sliding movement).

Figures 15A, 15B, 15C:
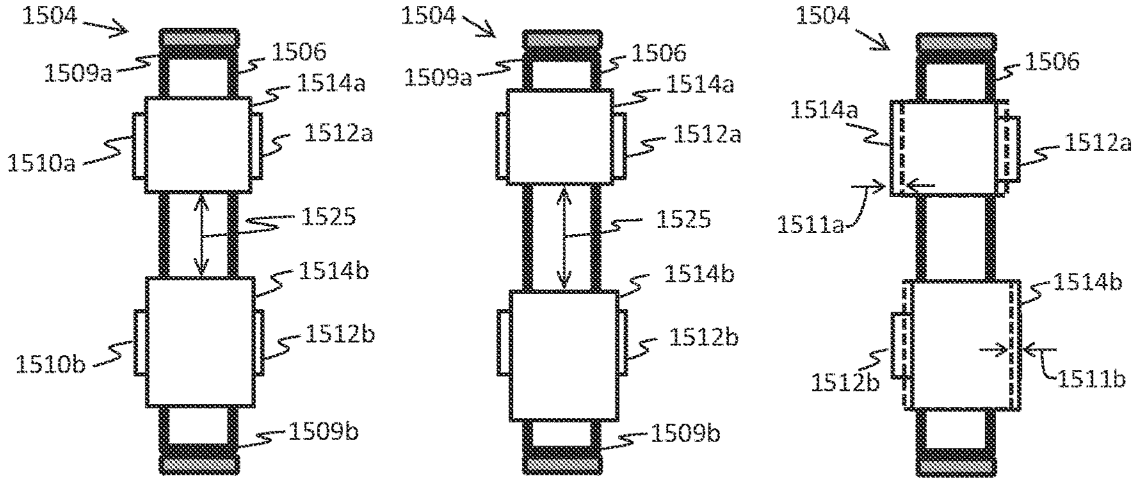
FIGS. 15A-15C depict top views of an operating table with board assemblies according to embodiments of the present technology.

An operating table 1504 may have one or more board assemblies secured thereto, such as chest board assembly 1510*a* and leg board assembly 1510*b*, as depicted in FIGS. 15A-15C. The board assemblies 1510*a*, 1510*b* may initially be secured to the table frame 1506 with the upper boards 1514*a*, 1514*b* and lower boards 1512*a*, 1512*b* of each assembly at initial respective positions, as depicted in FIG. 15A. The upper boards 1514*a*, 1514*b* are at a distance 1525 from each other. As shown in FIG. 15B, a user can slide one or both of the upper boards 1514*a*, 1514*b* with respect to the lower boards 1512*a*, 1512*b* such that the upper boards 1514*a*, 1514*b* are displaced lengthwise with respect to the table frame 1506. Note that the upper boards 1514*a*, 1514*b* can be slid lengthwise in either direction with respect to the table frame 1506 (i.e., toward the table frame head end 1509*a* or toward the table frame foot end 1509*b*). In the example of FIG. 15B, the upper boards 1514*a*, 1514*b* have been slid in opposing directions and away from each other, thereby increasing the distance 1525 between the upper boards 1514*a*, 1514*b*.

Board assemblies 1510*a*, 1510*b* may be adapted for lateral (sideways) movement of the upper boards 1514*a*, 1514*b* with respect to the bed frame 1506, as depicted in FIG. 15C. Such movement may be in either direction (i.e., to the left or to the right with respect to the bed frame). As depicted in FIG. 15C, chest upper board 1514*a* is shifted left a distance 1511*a* from its original position. Leg upper board 1514*b* is shifted right a distance 1511*b* from its original position.

Figures 16A, 16B, 16C, 16D:
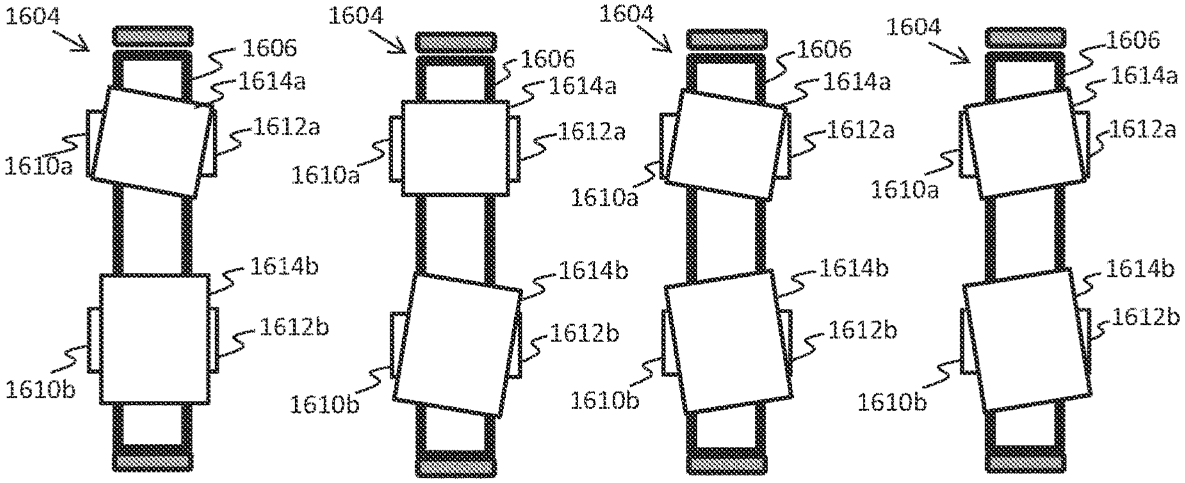
FIGS. 16A-16D depict top views of an operating table with board assemblies according to embodiments of the present technology.

As depicted in FIGS. 16A-16D, upper boards 1614*a*, 1614*b* may be rotated to and secured at one or more desired positions. In the example of FIG. 16A, chest upper board 1614*a* has been rotated to the right (clockwise). Note that rotation in the opposite direction (e.g., to the left or counterclockwise) is also within the scope of the embodiments. In the example of FIG. 16B, leg upper board 1614*b* has been rotated to the right (clockwise). Note that rotation in the opposite direction (e.g., to the left or counterclockwise) is also within the scope of the embodiments.

In the example of FIG. 16C, chest upper board 1614*a* has been rotated in one direction, and leg upper board 1614*b* has been rotated in the opposing direction. In the particular embodiment depicted, the chest upper board 1614*a* is rotated clockwise, and the leg upper board 1614*b* is rotated counterclockwise. Alternatively, the chest upper board 1614*a* could be rotated counterclockwise, with the leg upper board 1614*b* rotated clockwise.

In the example of FIG. 16D, chest upper board 1614*a* and leg upper board 1614*b* have both been rotated in the same direction, namely counterclockwise. Alternatively, they could be rotated clockwise.

Note that the direction and extent of rotation of respective upper boards can be varied according to the particular application, including the patient position desired by a surgeon or other user(s).

Note that rotation of the upper boards could be combined with sliding of the upper boards, including lateral and/or lengthwise sliding.

Figure 17A:
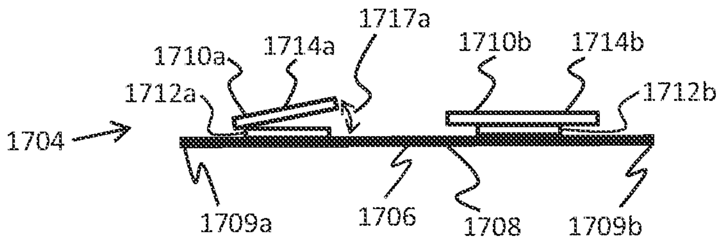
FIGS. 17A-17D depict side views of an operating table with board assemblies according to embodiments of the present technology.
Figure 17B:
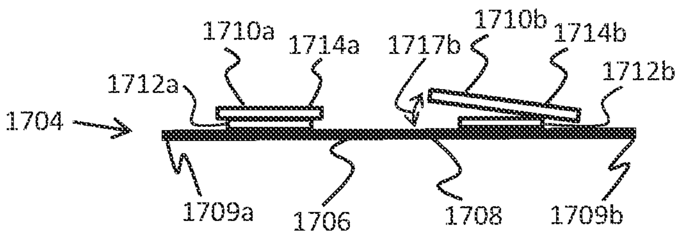

As discussed previously with respect to FIGS. 13A-13D, upper boards could be tilted for proper patient positioning. As depicted in FIGS. 17A-17B, a table 1704 has a frame 1706 with rails 1708 to which board assemblies 1710*a*, 1710*b* are secured via lower boards 1712*a*, 1712*b*. Chest upper boards 1714*a*, 1714*b* are tiltingly secured to the lower boards 1712*a*, 1712. Note that the chest upper boards 1714*a*, 1714*b* may also be rotatingly and/or slidingly secured to the lower boards 1712*a*, 1712*b*.

FIG. 17A depicts a chest upper board 1714*a* tilted from the lower board 1712*a* toward the head end 1709*a* at an angle 1717*a*. Note that the tilting could be in the other direction, e.g., tilted toward the foot end 1709*b*. FIG. 17B depicts leg upper board 1714*a* tilted toward the foot end 1709*b* at an angle 1717*b*. Note that the tilting could be in the other direction, e.g., tilted toward the head end 1709*a*.

Figure 17C:
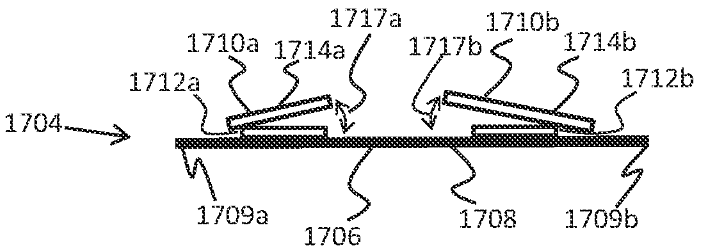
Figure 17D:
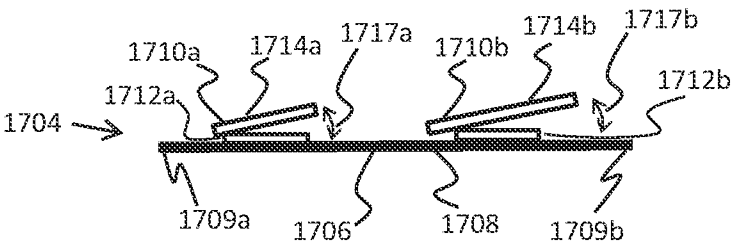

Both the chest upper board 1714*a* and the leg upper board 1714*b* could be tilted, as shown in FIGS. 17C and 17D. In FIG. 17C, the chest upper board 1714*a* and leg upper board 1714*b* are tilted way from each other by respective angles 1717*a*, 1717*b*. Note that the upper boards 1714*a*, 1714*b* could alternatively be tilted away from each other. In FIG. 17D, the chest upper board 1714*a* and leg upper board 1714*b* are both tilted toward the frame head end 1709*a* by respective angles 1717*a*, 1717*b*. Alternatively, the chest upper board 1714*a* and leg upper board 1714*b* could both tilted toward the frame foot end 1709*a*.

Note that tilting of the upper boards could be combined with rotation and/or sliding of the upper boards, including lateral and/or lengthwise sliding.

Various attachments may be used with the embodiments, such as attachments for engaging and/or supporting element of the patient's body, such as the head, back, shoulder, arms, legs, etc. Other attachments are also within the scope of the disclosure, including [cameras and/or mounts, and surgical support arms, etc. Note that multiple attachments may be used with a single board assembly, including any combination of the above examples of attachments.

Note that each element of each embodiment and its respective elements disclosed herein can be used with any other embodiment and its respective elements disclosed herein.

All dimensions listed are by way of example, and devices according to the disclosure may have dimensions outside those specific values and ranges. The dimensions and shape of the device and its elements depend on the particular application.

Unless otherwise noted, all technical and scientific terms used herein have the same meaning as commonly understood by one of ordinary skill in the art to which this disclosure belongs. In order to facilitate review of the various embodiments of the disclosure, the following explanation of terms is provided:

The singular terms "a", "an", and "the" include plural referents unless context clearly indicates otherwise. The term "or" refers to a single element of stated alternative elements or a combination of two or more elements, unless context clearly indicates otherwise.

The term "includes" means "comprises." For example, a device that includes or comprises A and B contains A and B, but may optionally contain C or other components other than A and B. Moreover, a device that includes or comprises A or B may contain A or B or A and B, and optionally one or more other components, such as C.

The term "subject" refers to both human and other animal subjects. In certain embodiments, the subject is a human or other mammal, such as a primate, cat, dog, cow, horse, rodent, sheep, goat, or pig. In a particular example, the subject is a human patient.

Although methods and materials similar or equivalent to those described herein can be used in the practice or testing of the present disclosure, suitable methods and materials are described below. In case of conflict, the present specification, including terms, will control. In addition, the materials, methods, and examples are illustrative only and not intended to be limiting. The descriptions of embodiments of the technology are not intended to be exhaustive or to limit the technology to the precise form disclosed above. Where the context permits, singular or plural terms may also include the plural or singular term, respectively. Although specific embodiments of, and examples for, the technology are described above for illustrative purposes, various equivalent modifications are possible within the scope of the technology, as those skilled in the relevant art will recognize. For example, while steps are presented in a given order, alternative embodiments may perform steps in a different order. The various embodiments described herein may also be combined to provide further embodiments.

As used herein, the terms "generally," "substantially," "about," and similar terms are used as terms of approximation and not as terms of degree, and are intended to account for the inherent variations in measured or calculated values that would be recognized by those of ordinary skill in the art.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

In view of the many possible embodiments to which the principles of the disclosed technology may be applied, it should be recognized that the illustrated embodiments are only examples of the disclosure and associated technology and should not be taken as limiting the scope of the technology. Rather, the scope of the technology is defined by the following claims. We therefore claim all that comes within the scope and spirit of these claims.

What is claimed is:

1. A patient support board assembly for use with an open-framed operating table having a bed frame having a bed frame length and at least one bed frame beam extending lengthwise with respect to the bed frame, the support board assembly comprising:

a lower board comprising a lower board overall length, a lower board overall width, a lower board overall thickness, a lower board top surface, and a lower board bottom surface, the lower board adapted to be releasably secured to the at least one bed frame beam in a position extending at least partially across a width of the bed frame and with the lower board bottom surface facing an upper surface of the at least one bed frame beam;

an upper board positioned on or above the lower board top surface, the upper board comprising an upper board overall length, an upper board overall width, an upper board overall thickness, an upper board top surface, and an upper board bottom surface, wherein the upper board is slidingly secured to the lower board with the upper board bottom surface facing the lower board top surface such that the upper board can be slidingly displaced with respect to the lower board in a movement plane parallel to a plane defined by the lower board top surface.

2. The patient support board assembly of claim 1, wherein the upper board is movably secured to the lower board with the upper board bottom surface facing the lower board top surface such that the upper board can be moved with respect to the lower board in the movement plane.

3. The patient support board assembly of claim 2, wherein the upper board is rotatably secured to the lower board with the upper board bottom surface facing the lower board top surface such that the upper board can be rotated with respect to the lower board in the movement plane.

4. The patient support board assembly of claim 1, wherein the upper board is tiltingly secured to the lower board with the upper board bottom surface facing the lower board top surface such that the upper board can be tiltingly displaced with respect to the lower board.

5. The patient support board assembly of claim 1, wherein the upper board comprises a plurality of upper board peg holes therein, each of the upper board peg holes adapted to slidingly receive a peg.

6. The patient support board assembly of claim 5, further comprising:

one or more pegs inserted into one or more of the upper board peg holes.

7. The patient support board assembly of claim 1, wherein the lower board comprises a plurality of lower board peg holes therein, each of the lower board peg holes adapted to slidingly receive a peg.

8. The patient support board assembly of claim 7, further comprising:

one or more pegs inserted into one or more of the lower board peg holes.

9. The patient support board assembly of claim 1, wherein the upper board comprises a plurality of upper board peg holes therein, wherein the lower board comprises a plurality of lower board peg holes therein, and each of the upper board peg holes and lower board peg holes is adapted to slidingly receive a peg.

10. The patient support board assembly of claim 9, further comprising:

at least one peg positioned at least partially within an upper board peg hole and simultaneously positioned at least partially within a lower board peg hole.

11. An operating table, comprising:

a table bed frame comprising at least one bed frame beam extending lengthwise with respect to the table bed frame; and a first patient support board assembly, wherein the first patient support board assembly comprises a patient support board assembly according to claim 1, wherein the first patient support board assembly is secured to the at least one bed frame beam at a first position along the length of the at least one bed frame beam.

12. The operating table of claim 11, further comprising:

a second patient support board assembly, wherein the second patient support board assembly comprises a patient support board assembly according to claim 1, wherein the second patient support board assembly is secured to the at least one bed frame beam at a second position along the length of the at least one bed frame beam.

13. The operating table of claim 11, wherein the upper board is rotatably and slidingly secured to the lower board such that the upper board can be slid along the upper board overall length with respect to the lower board.

14. The operating table of claim 13, further comprising:

a lock adapted to selectively hold the upper board at a desired rotational and sliding position with respect to the lower board.

* * * * *